(12) United States Patent
Thodberg (10) Patent No.: US 11,017,210 B2
(45) Date of Patent: May 25, 2021

(54) IMAGE PROCESSING APPARATUS AND METHOD

(71) Applicant: Visiana ApS, Hørsholm (DK)

(72) Inventor: Hans Henrik Thodberg, Holte (DK)

(73) Assignee: Visiana ApS, Hørsholm (DK)

( * ) Notice: Subject to any disclaimer, the term of this patent is extended or adjusted under 35 U.S.C. 154(b) by 47 days.

(21) Appl. No.: 16/301,872

(22) PCT Filed: May 18, 2017

(86) PCT No.: PCT/EP2017/061921
§ 371 (c)(1),
(2) Date: Nov. 15, 2018

(87) PCT Pub. No.: WO2017/198749
PCT Pub. Date: Nov. 23, 2017

(65) Prior Publication Data
US 2019/0147225 A1    May 16, 2019

(30) Foreign Application Priority Data

May 19, 2016 (DK) .............................. PA201670335

(51) Int. Cl.
*G06K 9/00* (2006.01)
*G06K 9/62* (2006.01)
*G06K 9/46* (2006.01)

(52) U.S. Cl.
CPC ..... *G06K 9/00281* (2013.01); *G06K 9/00382* (2013.01); *G06K 9/4614* (2013.01); *G06K 9/6282* (2013.01)

(58) Field of Classification Search
CPC ............. G06K 9/00281; G06K 9/4614; G06K 9/6282; G06K 9/00382; G06K 9/6256;
(Continued)

(56) References Cited

U.S. PATENT DOCUMENTS 3,069,654 A     12/1962  Hough
6,540,691 B1 *   4/2003  Phillips ................ G01N 33/497
                                                        422/84
(Continued)

OTHER PUBLICATIONS

EPO. International Search Report and Written Opinion for parent International Application No. PCT/EP2017/061921 dated Jul. 4, 2017, 9 pages.
(Continued)

*Primary Examiner* — Nimesh Patel
(74) *Attorney, Agent, or Firm* — Winthrop & Weinstine, P.A.

(57) ABSTRACT

One embodiment of this invention provides an image processing method for use in locating a landmark in an acquired image. The method comprises a method to sample several features from an image patch, and a decision tree, which performs a regression to the location of the landmark relative to the image patch. The image is scanned by extracting an image patch in many translated locations and for each patch applies the regression decision tree to produce one or more votes for the location of the given target point within the acquired image. The method further accumulates the regression votes for all of the patches in the scan to generate a response image corresponding to the given target point. The method finally performs an estimate of the local maxima of the voting map as the likely locations of the landmark.

15 Claims, 7 Drawing Sheets

(58) Field of Classification Search
CPC .... G06K 2209/21; G06K 9/2054; G06K 9/46;
G06K 9/6223; G06K 9/00791; G06K
9/00805; G06K 9/6267; G06K 9/6255;
G06K 9/00201; G06K 9/00248; G06K
9/00268; G06K 9/00275; G06K 9/00315;
G06K 9/00342; G06K 9/6269; G06K
9/00369; G06K 9/621; G06K 9/00228;
G06K 9/0063; G06K 9/2063; G06K
9/3241; G06K 2009/00738; G06K
9/6278; G06K 9/6293; G06K 9/00046;
G06K 9/00208; G06K 9/00362; G06K
9/00617; G06K 9/00651; G06K 9/00771;
G06K 9/00892; G06K 9/3233; G06K
9/34; G06K 9/4604; G06K 9/4638; G06K
9/6201; G06K 2009/00322; G06K
9/00785; G06K 9/00825; G06K 9/00832;
G06K 9/209; G06K 9/42; G06K 9/4671;
G06K 9/6219; G06K 9/6232; G06K
9/6273; G06K 9/6274; G06K 9/64; G06T
7/73; G06T 19/006; G06T 2017/30201;
G06T 15/50; G06T 2207/10004; G06T
2207/10016; G06T 2207/30241; G06T
7/11; G06T 2207/30204; G06T 7/74;
G06T 2207/10081; G06T 2207/30008;
G06T 11/001; G06T 2207/20221; G06T
5/50; G06T 7/0006; G06T 7/246; G06T
2207/20081; G06T 7/0012; G06T
2207/20076; G06T 2207/30201; G06T
2017/10024; G06T 7/75; G06T
2207/10028; G06T 7/0014; G06T 7/70;
G06T 2207/20084; G06T 2207/30196;
G06T 5/002; G06T 2200/04; G06T
2207/20004; G06T 2207/20182; G06T
7/33; G06T 17/00; G06T 2207/30168;
G06T 7/0002; G06T 7/50; G01C 21/165;
G01C 21/28; G01C 21/30; G01C 21/34;
G01C 21/3476; G01C 21/3602; A61B
5/1118; A61B 5/4866; A61B 2560/0223;
A61B 2576/00; A61B 5/0002; A61B
5/1128; A61B 5/4528; A61B 5/4875;
A61B 5/681; A61B 5/6824; A61B
5/7257; A61B 5/726; A61B 5/7264; A61B
5/7267; A61B 5/7278; A61B 5/742;
G06N 20/00; G06N 3/04; G06N 3/08;
G06N 5/04; G06N 5/003; G06N 5/025;
G06N 3/0454; G06N 7/005; G06N 20/20;
G06N 5/00; G06N 3/00; G06N 3/006;
G06N 3/008; G06N 3/0445; H04W
4/023; H04W 4/021; H04W 4/026; H04W
4/027; H04W 4/44; H04W 4/024; H04W
4/029; H04W 4/02; H04W 4/40; H04W
24/04; H04W 4/025; H04W 52/0258

See application file for complete search history.

(56) References Cited

U.S. PATENT DOCUMENTS

| | | | | |
|---|---|---|---|---|
| 7,751,599 | B2* | 7/2010 | Chen | G06K 9/00281 |
| | | | | 382/103 |
| 9,058,537 | B2 | 6/2015 | Yoshii | |
| 10,268,876 | B2* | 4/2019 | Ihara | G06K 9/00268 |
| 2007/0053563 | A1 | 3/2007 | Tu et al. | |
| 2014/0172753 | A1 | 6/2014 | Nowozin et al. | |
| 2015/0186748 | A1 | 7/2015 | Cootes et al. | |
| 2015/0243031 | A1 | 8/2015 | Narasimha et al. | |
| 2015/0379376 | A1* | 12/2015 | Muff | G06K 9/6267 |
| | | | | 382/224 |
| 2019/0236803 | A1* | 8/2019 | Wang | G06K 9/00281 |
| 2019/0370530 | A1* | 12/2019 | Lin | G06T 7/246 |

OTHER PUBLICATIONS

J. Gall and V. Lempitsky. Class-Specific Hough Forests for Object Detection. 2009 IEEE Conf. Comput. Vis. Pattern Recognit, IEEE, pp. 1022-1029 (2009).

Cootes TF, Ionita MC, Lindner C, Sauer P (2012) Robust and Accurate Shape Model Fitting Using Random Forest Regression Voting. Comput. Vision—ECCV 2012. pp. 278-291.

Thodberg HH, Olafsdoltir H (2003) Adding curvature to minimum description length shape models. Proc Br Mach Vis Conf 2:251-260.

Amit Y, Geman D (1997) Shape Quantization and Recognition with Randomized Trees. Neural Comput 9:1545-1588.

Breiman L (2001) Random Forests. Mach Learn 45:5-32.

Shotton J, Fitzgibbon A, Cook M, Sharp T, Finocchio M, Moore R, Kipman A, Blake A (2011) Real-time human pose recognition in parts from single depth images. CVPR 2011. IEEE, pp. 1297-1304.

Cootes TF, Taylor CJ, Cooper DH, Graham J (1995) Active Shape Models—Their Training and Application. Comput Vis Image Underst 61:38-59.

Thodberg HH, Kreiborg S, Juul A, Pedersen KD (2009) The BoneXpert method for automated determination of skeletal maturity. IEEE TransMedImaging 28:52-66.

Criminisi A, Robertson D, Konukoglu E, Shotton J, Pathak S, White S, Siddiqui K (2013) Regression forests for efficient anatomy detection and localization in computed tomography scans. Med Image Anal 17:1293-303.

Criminisi A, Shotton J (2013) Decision forests for computer vision and medical image analysis. Springer. Book coversheet attached—electronic book not available.

* cited by examiner

IMAGE PROCESSING APPARATUS AND METHOD

FIELD OF THE INVENTION

The present invention relates to an image processing method and apparatus for localising a target in an acquired image.

BACKGROUND

Methods to locate targets in images are of general importance in automated image analysis systems. Often the processing is divided into two major steps. In the first step, the target is localized (often called "segmented") and, in the second step, the target is classified by sampling the image relative to the detected location. The location of the target may be the location of an anchor point e.g. the centre of mass of the object, or the target can be represented by several so-called landmarks on the object, e.g. its corners, which together outline (or segment) the object sufficiently accurate to allow for the classification in the second processing step.

The article "Class-specific Hough forests for object detection" by Gall J, Lempitsky V; 2009 IEEE Conf. Comput. Vis. Pattern Recognit. IEEE, pp 1022-1029 describes the so-called Hough Forest (HF) method. Following its introduction in 2009, the Hough Forest (HF) method quickly gained popularity in computer vision and medical image analysis. Generally, the HF method is a method for the localisation of landmarks or objects in 2D and 3D images. It combines the Generalised Hough Transform with a random forest (RF). For the purpose of the present disclosure, and following the terminology used by Gall, the term "Hough" is used to refer to this use of the Generalised Hough Transform. The Hough method predicts the location of the landmark or object via a voting procedure, in which many image patches across the image predict—or vote for—the desired location, and the local maxima in the voting array are a robust estimate of the one or more locations. In the HF, a RF is used to implement the prediction of the location from any image patch. The RF implements a regression, which for 2D images has two continuous outputs, that is, the displacement vector from the patch centre to the desired location. Gall considered a particular embodiment of the Hough method, where the aim is to locate an object, e.g. a pedestrian or a car in a scene. The object is represented by a landmark, so the task is to predict the x and y coordinates of this landmark in the acquired image canvas.

A patch is a sub-region of the image, which will also be referred to as a sampling area. Within each patch one can define a bank of image features; Gall used the difference of grey tones in two different regions of the patch. Thus, in this prior art method one is faced with the task of mapping a large number of features into a prediction of the landmark relative to the patch. Gall proposed to implement this mapping with a random forest, i.e. with a randomized ensemble of decision trees where every node of every tree tests whether a certain feature has a value above a certain threshold.

The landmark position is obtained by sampling the patch in many different locations and for each patch applying the RF to produce votes for the location of the landmark. A vote is an individual prediction of the location of the target. The votes are accumulated in a 2-dimensional histogram with cells corresponding to the pixels in the acquired image. After generating many votes, e.g. hundreds, the local maxima of the voting array are detected and these represent candidates for the location of the landmarks or objects.

Hence Galls method may be summarised as a combination of the Hough method and a random forest (RF).

Similarly, US20150186748 discloses an image processing apparatus and method for fitting a deformable shape model to an image using random forest regression voting.

While the above prior art methods are useful for detecting landmarks in images, it remains desirable to increase the accuracy of the detection. It also remains desirable to reduce the size (measured in bytes) of the prediction model when implemented on a computer.

SUMMARY

According to a first aspect, disclosed herein is a computer-implemented image processing method for locating a target within an input image, said method comprising:
a) providing a regression decision tree defined by a plurality of nodes, the plurality of nodes comprising decision nodes and leaf nodes, the leaf nodes being indicative of respective predicted locations of the target, each decision node having associated with it a decision rule wherein each associated decision rule has associated with it a selected image feature selected from a set of predetermined image features; wherein each selected image feature is chosen from said predetermined set of image features such that the associated decision rule results in an optimal performance measure compared to all other image features of said predetermined set of image features;
b) selecting multiple sampling areas within the input image;
c) for each sampling area of the selected multiple sampling areas:
   computing respective detection scores for one or more of the set of predetermined image features;
   using said regression decision tree and said computed detection scores to compute one or more regression votes, each regression vote being indicative of a predicted location of the target within the acquired image;
d) generating a response data structure by accumulating the regression votes determined by said regression tree for respective predicted locations; and
e) determining an estimated location of the target from said response data structure.

It has been realised by the inventor, that an improved detection performance can be achieved by the use of a single decision tree where the decision rules of the decision nodes are determined in an optimisation procedure based on a set of predetermined image features where, for each decision node of the decision tree, the optimisation procedure is performed based on the same set of image features such that each decision node is trained based on all image features of the set. This is in contrast to the randomization performed when using a random forest. When creating a random forest of trees, the optimisation procedure for defining the decision nodes of a tree only considers random subsets of a global set of image features; where different random subsets are applied to different decision nodes of a tree. The introduction of this randomness has previously been believed to improve the performance of the resulting random forest of trees. However, the present inventor has realised that, for the purpose of detecting targets in an image by analysing multiple sampling areas in the image, a single decision tree without the introduction of randomly selected subsets of image features for the generation of each decision node, results in an improved detection performance compared to prior art Hough forests.

Embodiments of the present invention can briefly be described as being based on a modification of Gall's Hough Forest method, in which the random forest (RF) is replaced by a single, non-random decision tree (DT). For the purpose of the present description, this new method will be called the Hough Tree (HT) method.

Here the term non-random is intended to describe a property of the decision tree and, in particular, the way the tree is designed from the training data: Contrary to a random forest, a decision tree of embodiments of the present invention is trained without introducing one or more sources of randomness. In particular, all features of a predetermined set of features are used when designing each of the decision nodes. Additionally, some embodiments avoid additional sources of randomness. For example, in some embodiments, the decision tree is trained using all training examples in the training set (i.e. without the so-called "bagging"). As will be described in detail below, experiments by the inventor indicate that embodiments of the present method can give 14% smaller error of the localisation than the HF. In addition it uses less memory and, in some embodiments, ten times less memory.

Generally, training images are images where the target locations are known beforehand and which are used in a data-driven method for creating a decision tree, e.g. by means of an optimisation procedures configured to optimize a predetermined performance measure.

Training of a decision tree may be performed by optimizing one decision node at a time starting from the root node. Each decision node is optimized according to a performance measure. Several performance measures may be used. Some embodiments use the variance of the known location vectors of the training images, i.e. of the variable that the regression three is trained to predict. In particular, in some embodiments, the performance measure is a measure of a weighted sum of the variances of the known locations of the sampling areas that are mapped to the respective outgoing child branches of the decision node. Hence, the performance measure for a current decision node is a function of the decision rule of that decision node and, in particular, of the image feature and the threshold on which the decision rule is based. For example, the performance measure may be indicative of an amount of variation of the known locations of targets in the training sampling areas that are assigned to respective outgoing branches of a decision node by the decision rule associated with said decision node In one embodiment, for a given decision rule of a current decision node, e.g. as defined by an image feature and a threshold, computing the performance measure may comprise:

applying the decision rule to all training sampling areas that, when fed into the decision tree, are propagated from the root node and through one or more previously processed decision nodes (i.e. decision nodes for which a decision rule has already been determined), if any, to said current decision node, when the training sampling area is fed into the decision tree and subjected to the decision rules of the root node and the previously processed decision rules; and wherein applying the decision rule to a training sampling area results in the training sampling area being mapped to one of the outgoing branches of the decision nodes;

computing a variance of the known locations of targets associated with the training sampling areas that are assigned to the respective outgoing branches of a decision node by the decision rule associated with said decision node;

computing the performance measure as a weighted sum of the computed variances.

Hence, minimizing the above performance measure seeks a decision node to implement a split that minimizes the weighted sum of the variances in the two child branches. Other examples of performance measures include a cross-entropy-based measure or other performance measures known as such in the art.

Embodiments of the present invention may be used for a variety of image processing tasks. It has proven particularly useful for solving 2D medical imaging problems, such as the problem of the localisation of landmarks (e.g. 156 landmarks) on bones (e.g. 15 bones) in pediatric hand X-rays. The clinical applications of embodiments of the method described herein thus include bone age determination and assessment of arthritis. The HF has previously been applied successfully to such images (see e.g. Cootes T F, Ionita M C, Lindner C, Sauer P (2012) Robust and Accurate Shape Model Fitting Using Random Forest Regression Voting. Comput. Vision—ECCV 2012. pp 278-291) and embodiments of the method described herein may conveniently be implemented in a similar manner.

Generally, a decision tree is data structure representing a sequence of decisions/choices. The decision tree comprises a plurality of nodes that are hierarchically structured from a root node via number of decision nodes to a plurality of leaf nodes. The root node represents an initial decision that splits into a number of outgoing branches, which each terminate in either a decision node or a leaf node. Just as the root node, each decision node represents a decision that splits into a number of branches (i.e. that assigns an input to that node to one of the outgoing branches of that node); each branch terminates in either another decision node or in a leaf node. Hence, the root node may be regarded as a special type of decision node, namely one that has no incoming branches, i.e. no "parent" nodes, but only outgoing branches to "child nodes". This architecture is iterated and each branch can either be terminated by a leaf node, or end in a decision node. The decision tree processes an observation (e.g. a sampling area of an input image) by propagating it from the root node down the tree; at each decision node the observation is subjected to a test based on one of the features derivable from the observation, which decides which branch is taken from there. In some embodiments, each decision node has two outgoing branches. However, it will be appreciated that other embodiments may include more than two outgoing branches. The decision is defined by a decision rule, i.e. each decision node has a decision rule associated with it. Each decision rule has an image feature of a set of image features associated to it. An image feature may be regarded as a processing rule (also referred to as feature detector) that receives the sampling area as an input and computes a single or multiple result values indicative of a degree of the feature being present. This process is also referred to as feature detection. There are numerous feature detectors for detecting various types of image features known as such in the art of computer vision, such as edged detectors, corner detectors, blob detectors, etc. The result value of the feature detection is also referred to as a detection score and is indicative of a degree by which the feature associated with the decision rule is present in the sampling area. The decision rule may further have a decision threshold associated with it. The test performed by a decision rule may thus involve computation of a detection score for the associated feature and based on the sampling area. The test may then compare the computed detection score with the decision threshold. Based on this comparison, the process may proceed with one or with the other branch leading away from the decision node (e.g. one branch is followed, if the detection score is smaller than the decision threshold; otherwise the other branch is followed). When a sampling area is input to the decision tree, the tree is traversed from the root node via a number of decision nodes until the process reaches a leaf node. At each decision node, the corresponding decision rule is applied based on the sampling area and using the feature associated with the respective decision node. The leaf nodes thus represent the possible outputs of the decision tree. For example, each leaf node may represent a predicted location of the target.

A decision tree may be implemented on a computer by a suitable data structure, e.g. using pointers or similar references and/or using object-oriented programming. In an object-oriented representation, an object representing a decision node may be defined which contains the decision rule (e.g. the applicable feature and the threshold), and pointers to the child nodes (i.e. a child decision node or a child leaf node). Another object used as building block of the tree represents a leaf node which contains the result of the decision tree when an observation ends up there (e.g. indicative of a predicted location of a target within the image). A DT can be used for classification or for regression. Decision trees are well-known models known as such in the art, e.g. referred to as ID3 by Quinlan, and as Classification and Regression Trees (CART), respectively.

Embodiments of the present invention use the DT for regression so it will also be referred to as a regression tree or regression decision tree. In a regression tree, each leaf node represent the value(s) of the quantity (or quantities) being regressed, or a set of values representing a distribution.

In some embodiments, the regression tree produces a displacement vector (or several vectors representing a distribution) as output. Each vector indicates where the target point is predicted to be located relative to a reference position of the patch, e.g. the centre of the patch, and this prediction is used to place a vote for the landmark location in the voting array.

The decision tree is created based on examples for which the correct result is known, i.e. by a data-driven process. The process of creating a decision tree from examples is also referred to as training and the examples as training examples. In embodiments of the present invention, the training examples are created from training images, i.e. the training is based on a set of training images for which the location of the target within each training image is known. The training is further based on a predetermined set of image features. In embodiments of the present invention, a feature may be represented by a predetermined filter that is applicable at a location within a sampling area. Each filter may be applied at multiple locations within a sampling area, corresponding to respective features. Multiple features may thus be based on the same filter.

The training is typically an iterative process, starting at the root node. The root node is optimised by selecting the image feature and the threshold that leads to the smallest dispersion of the target variables falling in each branch (alternative performance measures can be used, notably entropy-based measures) when the root node is presented with the training examples, i.e. the patches created from the training images. In some embodiments, the target variables are the displacement vectors indicating the target location relative to the sampling areas. The optimisation includes selecting an optimal image feature and an optimal threshold for the root node, where the optimal image feature is selected from the complete set of all available image features. Subsequently, the other decision nodes are optimised in the same manner, but based on the training examples that arrive at the decision node.

Accordingly, in some embodiments, the optimisation procedure comprises processing the decision nodes starting from a root node of the decision tree; wherein processing a current decision node comprises:

determining a subset of the sets of training sampling areas wherein each training sampling area of the subset is propagated from the root node and through one or more previously processed decision nodes, if any, to said current decision node when the training sampling area is fed into the decision tree and subjected to the decision rules of the root node and the previously processed decision rules; and associating a selected image feature from said predetermined set of image features with the decision rule of the current decision node such that the associated decision rule results in an optimal performance measure compared to all other image features of said predetermined set of image features when the associated decision rule is applied to said determined subset of training sampling areas.

The input image may be an image captured by an image capture device, such as a digital camera, a digital x-ray apparatus, or another image-generating device. In some embodiments, the process comprises a pre-processing stage, i.e. the process may receive an acquired image (which in itself may or may not already have been subject to processing by an external device) and pre-process the acquired image so as to generate the input image which is then fed into the target detection stage of the process. The pre-processing may comprise one or more processing steps, such as scaling, rotation, cropping, normalisation, colour correction, etc.

A patch is a sub-image of an image; for the purpose of the present description a patch is also referred to as a sampling area. While a patch may have different shapes, a frequent choice is a rectangular patch, such as a square patch, e.g. a 16-by-16 pixel sub-image. In some embodiments, all patches have the same shape and size while, in other embodiments, the shapes and/or sizes of the different patches may vary.

A target refers to an image element such as a target point, a line segment, a shape, etc. For the purpose of the present description, a target is also referred to as a landmark. In particular, a landmark may be a point in an image at a location of interest, e.g. the tip of a finger, the center of an eye, or a point on the border of an extended object. The landmark may also be a line segment, e.g. a segment of a border of an object. The method locates a landmark, or an object represented by some reference point in the object, say the centre of an object. This point or image element to be located is referred to as the target.

The present disclosure relates to different aspects including the computer-implemented method described above and in the following, corresponding apparatus, systems, methods, and/or products, each yielding one or more of the benefits and advantages described in connection with the first mentioned aspect, and each having one or more embodiments corresponding to the embodiments described in connection with the first mentioned aspect and/or disclosed in the appended claims.

In particular, according to one aspect, the present disclosure relates to a data processing system having stored thereon program code configured to cause, when executed by the data processing system, to cause the data processing system to perform the steps of the method described herein.

The data processing system may be a suitably programmed computer. The data processing system may have an interface for receiving an input image, e.g. directly from an image capture device via a suitable connection for data communication, via a computer network or other communications network, or the like. Alternatively, the input image may be received from a data storage medium such as a hard disk, a volatile or non-volatile memory, a memory device, or the like. According to another aspect, an image processing system comprises an image capture device and a data processing system as described herein. The data processing system may thus receive image signals (analogue or digital) from the image capture device indicative of one or more images captured by the image capture device. The data processing system may thus be configured to process the captured images, where the processing includes an embodiment of the method disclosed herein.

The data processing further comprises a storage medium for storing a computer program comprising program code configured to cause the data processing system to perform the steps of the method disclosed herein, when the computer program is executed by the data processing system. To this end, the data processing system comprises a processor, e.g. a CPU, for executing the computer program.

The data processing system may further comprise a storage medium having stored thereon a digital representation of the trained decision tree as described herein and a digital representation of the features and patches, e.g. their locations and shapes and/or sizes. These representations may be stored as an integral part of the program code or separate from the program code, e.g. as one or more separate files.

Generally, the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units. The processor may be a processor of a data processing system. The data processing system may comprise a suitably programmed computer such as a portable computer, a tablet computer, a smartphone, a PDA or another programmable computing device. In some embodiments, the data processing system may include a client system and a host system. The client and the host system may be connected via a suitable communications network such as the internet.

The present disclosure further relates to a computer program comprising computer program computer program code that causes a data processing system to carry out the steps of an embodiment of one or more of the methods described herein, when the computer program code is executed by the data processing system. The computer program may be embodied as a computer-readable medium having stored thereon the computer program code.

DETAILED DESCRIPTION

Various aspects and embodiments of image processing methods and apparatus disclosed herein will now be described with reference to the drawings.

Figure 1:
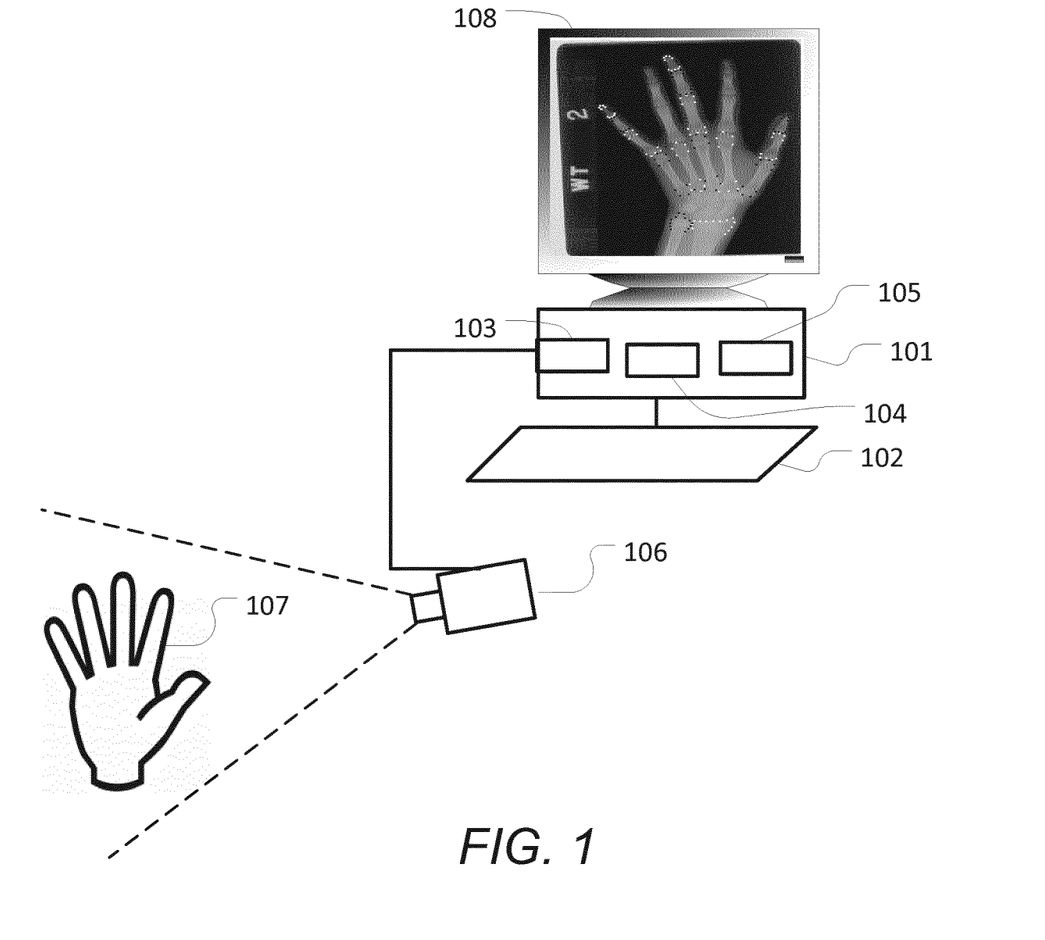
FIG. 1 shows a block diagram of an example of an image processing system.

FIG. 1 shows a block diagram of an example of an image processing system. The system comprises a data processing system, in this example a computer 101 having a display 108 and a keyboard 102 or similar input device for receiving user input. The system further comprises an image capture device 106, in this example a digital x-ray apparatus operable to obtain x-ray images of an object 107, in this example of a subject's hand. The image capture device 106 is communicatively coupled to the computer 101 so as to communicate captured images from the image capture device to the computer. To this end the computer comprises a suitable data interface 103, e.g. a USB port, a network adaptor for wired or wireless network connection, e.g. a LAN adaptor, a wifi device, and/or the like. The computer further comprises a CPU 104 and a storage medium 105 such as a hard disk, a RAM, and/or the like for storing program code and/or image data and/or a digital representation of a decision tree, etc. In particular, the computer 101 is programmed to perform the steps of an embodiment of the method disclosed herein, e.g. the embodiment described below with reference to FIGS. 2 and/or 3. It will be appreciated, however, that embodiments of the method described herein, e.g. the embodiments of FIGS. 2 and 3 may also be implemented on other types of data processing systems.

Figure 2:
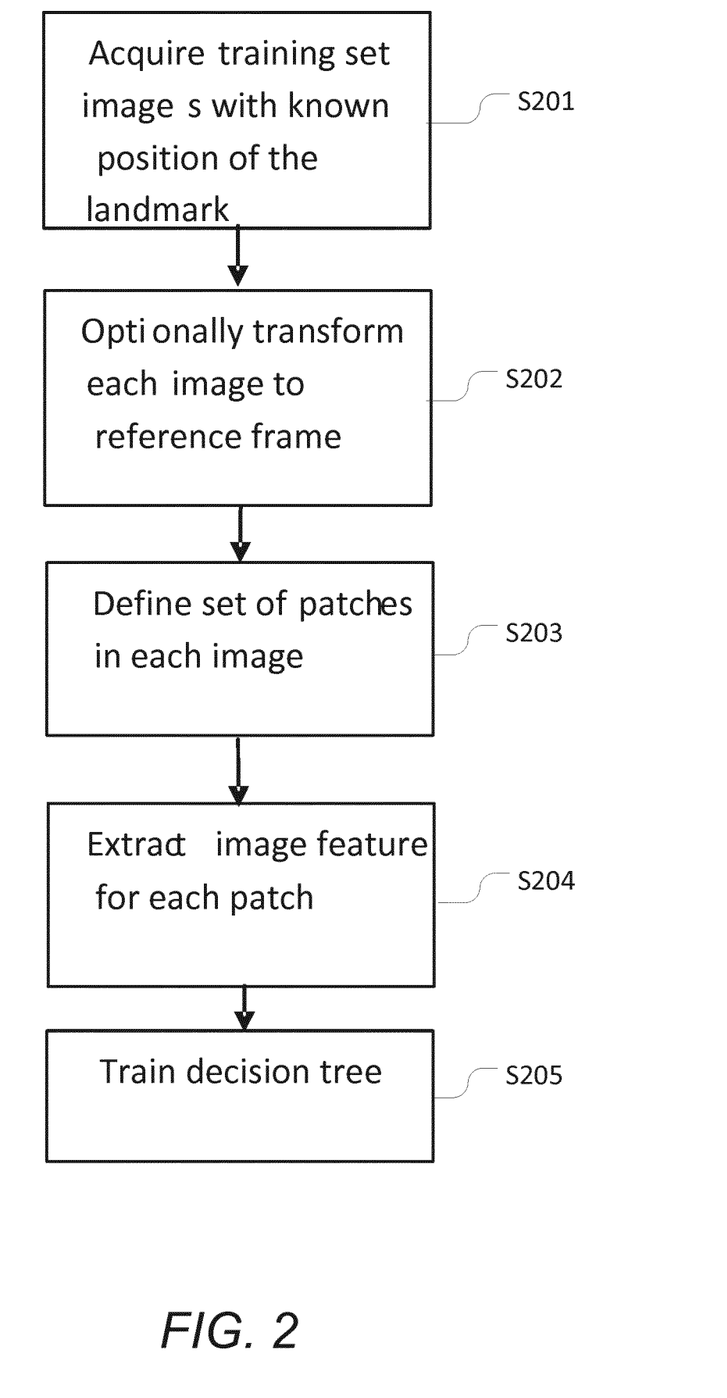
FIG. 2 shows a flow chart of a training stage of an example of a method for localising a landmark.

FIG. 2 shows a flow chart of a training stage of an example of a method for localising a landmark. The training stage is data driven and results in a trained decision tree which can subsequently be employed to detect targets in previously unknown images.

For the purpose of the present description, an example is described where the HT is operable to detect a single landmark in the form of a target point. It will be appreciated that other embodiments may be used for detecting multiple landmarks and/or other types of landmarks. The process may be implemented by a suitably programmed data processing system e.g. the data processing system shown in FIG. 1.

In initial step S201, the process receives a set of training images where the landmark's position in the image is known. For example, the landmark may be a point representing a target area within an object depicted in the image.

In subsequent step S202, the process rotates each training image so as to align an object depicted in the image along a predetermined axis. The process further scales the image to a predetermined size. The axis and size can e.g. be determined during an earlier step of an image processing pipeline, or they can be specific to a certain application context. One can define a direction, which is characteristic for this mark. Alternatively this direction can be the x-axis. It will be appreciated that this pre-processing step is optional and may not be required in some embodiments and/or for some types of images or landmarks.

In subsequent step S203, for each of the training images, the process forms a number of training examples by selecting patches displaced relative to the known landmark with a range of displacements up to maximum displacement. Each patch forms a training example, and what needs to be learned from the example is the displacement vector from the center of the patch (or from some other reference location, e.g. a corner, of the patch) to the landmark location.

In subsequent step S204, the process defines a set of image features for each patch. The image features may be defined as filters that can be applied to the patch, e.g. at different locations within the patch. A preferred choice of features is based on Haar filters, because they are fast to compute and have been shown to be efficient in the context of HF. An image feature, when applied to a patch, results in a feature value. Hence, each patch, i.e. each training example, has associated with it a set of inputs and an output. The inputs may be the feature values resulting from applying the respective features to said patch and the output may be the known displacement of the patch from the landmark location.

In subsequent step S205, the process trains the DT to predict the displacements vectors from the image patches as represented by the training examples.

In one embodiment, training step S205 may comprise the following steps:
1) Initiate the training of the decision tree by defining the root node as the first decision node to be designed and through which all training examples shall be propagated.
2) Design the next decision node by selecting the feature and threshold that best device the training examples into child nodes. As described herein this selection is based on a suitable performance measure, e.g. the weighted sum of variances of the target locations of the examples that are mapped into the respective child nodes.
3) Categorise each of the child nodes as either a (yet to be designed) decision node or as a leaf node (requiring no further design). This categorisation may e.g. be based on the number of examples mapped into the respective nodes.
4) Repeat steps 2 and 3 until there are no more decision nodes to be designed.

Figure 3:
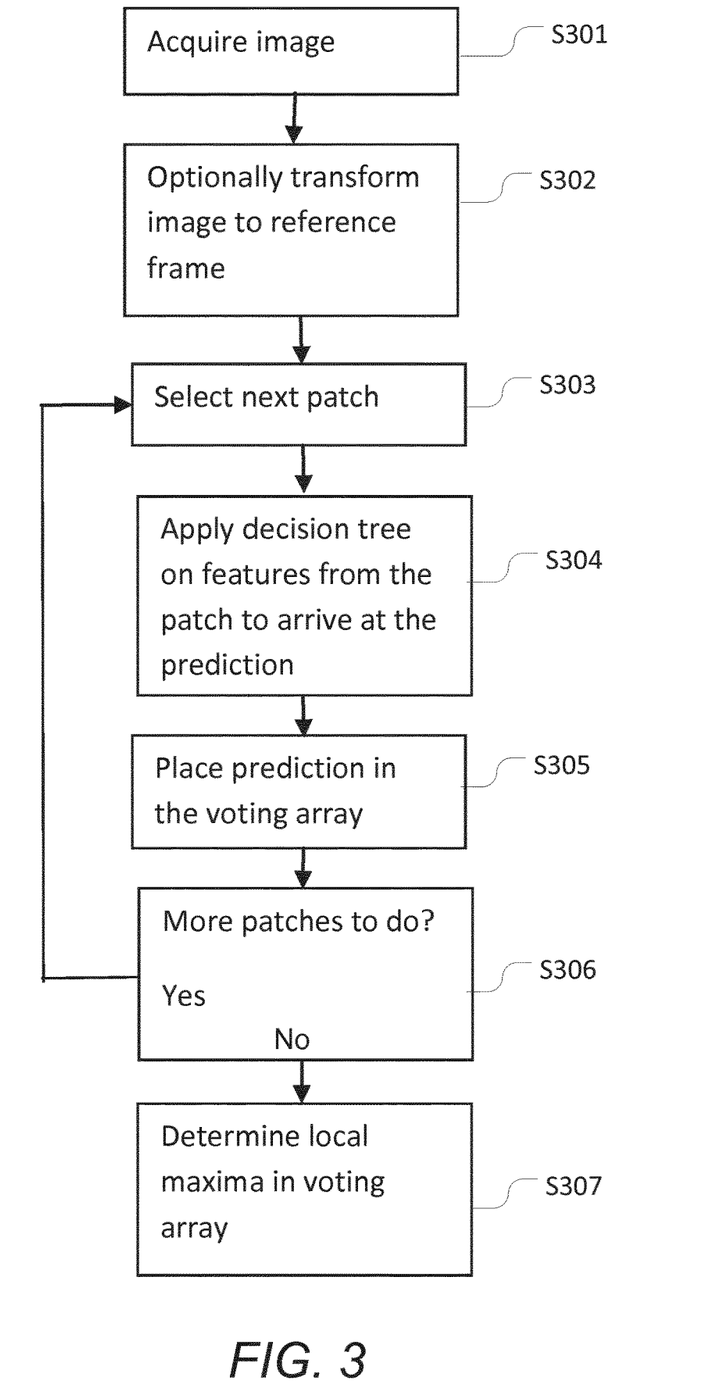
FIG. 3 shows a flow chart of a run-time prediction stage of an example of a method for localising a landmark.

FIG. 3 shows a flow chart of a run-time prediction stage of an example of a method for localising a landmark. For the purpose of the present description, an embodiment is described where the trained HT is operable to detect a single landmark in the form of a target point. The trained HT may be provided by the method of FIG. 2 or by another suitable training process. It will be appreciated that other embodiments may be used for detecting multiple landmarks and/or other types of landmarks. The process may be implemented by a suitably programmed data processing system e.g. the data processing system shown in FIG. 1. It will be appreciated that the training process and the process of applying a trained HT may be performed by the same data processing system or by different data processing systems.

At initial step S301, the process acquires an input image. Optionally, at step S302, the process rotates and scales the acquired image so that a target object is expected to be along a predetermined axis and has a predetermined size. This transformation can be based on knowledge from a previous step in an image processing pipeline, or it can be specific to certain application context. For instance, a mugshot of a face can be assumed to present the head within a certain limited range of rotation and magnification, as specified by the physical circumstances under which the image is captured. In some cases this transformation step may not even be needed.

During the subsequent steps, the process samples patches at a range of locations. For example, the process may scan a patch template across the image. The scanning can be all over the image, or it can be in a restricted to a sub-region in order to save processing time. The restricted sub-region can e.g. be obtained by prior knowledge of the possible locations of the landmark, or it can originate from a previous step in the processing pipeline.

To this end, at step S303, the process selects the next patch to be processed, i.e. the following steps are performed for each patch. At step S304, for each position of a patch, the process generates the image features used by the decision tree, and processes the patch through the DT to produce a prediction of the displacement. In a simple embodiment, a single displacement vector is produced, representing the most likely displacement of the patch relative to the landmark location. In more complex embodiments, a range of displacement vectors can be stored in each leaf node of the tree. At step S305, the displacement vector or range of displacement vectors is used to cast a vote in an accumulator array, called the voting map, which can be viewed as an image of the same dimensions as the original image. The weight of the vote can be a constant, or it can be output by the tree, if the tree was set up to store at each leaf node a measure of certainty of its prediction at this leaf node, for instance represented by the standard deviation of the displacement vectors that ended up at this leaf node during training.

At step S306, the process determines whether there are further patches to be processed. If so, the process returns to step S303 and selects the next patch to be processed. Otherwise, the process proceeds to step S307.

At step S307, the process optionally post-processes the voting map, e.g. smearing it in order to remove spurious local maxima, as they merge their weights with a more clearly recognized maximum, which represents the final determination of the landmark location, or locations. The process determines the maximum of the voting map. The location of the maximum can be determined as the location of the pixel with most votes, or the process can obtain sub-pixel accuracy by various means of interpolation for fitting, see example below for one embodiment, which is using fitting to a quadratic function. The strength and width of a maximum can be used as indicator of the reliability of the determination, e.g. to be used in subsequent processing step in in the pipeline, e.g. when used in conjunction with the Active Shape Model (ASM) (e.g. as described in Cootes T F, Taylor C J, Cooper D H, Graham J (1995) Active Shape Models—Their Training and Application. Comput Vis Image Underst 61:38-59). The use in relation to ASM is detailed later in this application.

Example

An embodiment of the method described herein has been used to identify target points in x-ray images of hand and the performance of the HT method disclosed herein has been compared to the HF method.

In particular, this example was concerned with the HF/HT localisations of landmarks in 38 dpi x-ray images of hands, which is particularly important and illustrative. In 38 dpi there is an average distance of 32 pixels between the distal endpoints in metacarpal 2-5. At this step in the pipeline, the size and orientation of the bones are reasonably well known, which is beneficial to the HF and HT methods.

For the purpose of training the respective models, a set of N annotated training images were prepared from a database of annotated hand X-ray images. The images were posterior-anterior hand X-rays of children of age 14-19. The data was from healthy children and from children seen in clinical context i.e. with the typical diagnoses of pediatric endocrinology (Turner Syndrome, Growth Hormone deficiency, etc.). Fifteen bones were annotated: metacarpals 1-5, the phalanges in finger 1, 3 and 5, and the distal 4 cm of radius and ulna. The number of annotated cases per bone varied from 62 to 97 and was on average 77.

The bones were annotated in 300 dpi by placing points along the boundary so that the resulting polyline traced the boundary to within 2 pixels (0.17 mm). The boundaries were intended to be close to locations of maximal gradient.

The contours of each bone were processed by the Minimum Description Length Method augmented with a curvature feature (see Thodberg H H, Olafsdottir H (2003) Adding curvature to minimum description length shape models. Proc Br Mach Vis Conf 2:251-260) to obtain 64 marks per bone at locations which correspond across the examples. Two opposite marks were then selected visually to represent the proximal and distal ends, and given the numbers 0 and 32. For radius and ulna the contour was cut off proximally by an ad hoc procedure that ensures a fixed length-to-width ratio of the contour.

Figure 4:
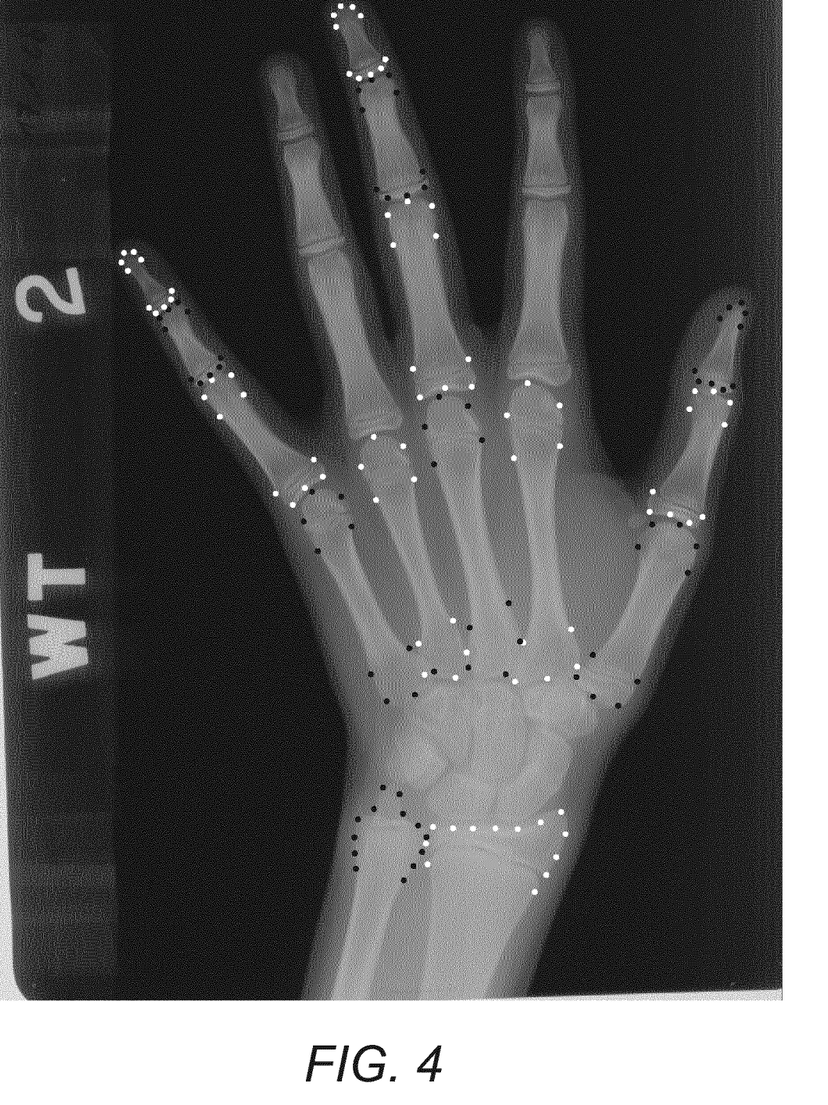
FIG. 4 shows an X-ray image in 150 dpi (dots per inch, i.e. pixels per inch) of a child's hand showing 156 landmarks to be located by an embodiment of the method described herein.

For the present analysis ten of the 64 marks were selected on each short bone and 13 on radius and ulna, as illustrated by dots in FIG. 4. These are the targets for the HF and HT methods in the comparative experiment.

For each bone, the annotated images were rotated to have the bone axis pointing upwards and scaled to have a length equal to the average bone length in the resolution 38 dpi.

For each landmark a nominal direction of the normal to the contour was defined as the average of this normal across the training set.

For each of the N images nine training examples were created with small perturbations in scale and angle: The perturbation angle was formed uniformly in the interval ±0.09 radians and the magnification factor uniformly in the interval 0.94-1.06.

From these 9 N images, and for each landmark, P=24000 patches of size 16 by 16 pixels were created, each centred at a displacement from the true landmark position. The displacements were chosen to be uniformly distributed within ±8 pixels in the x and y directions.

Figure 5:
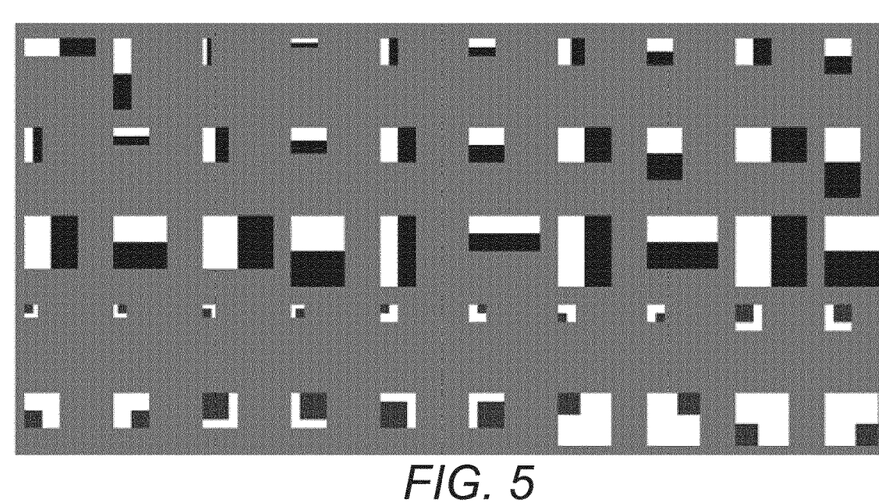
FIG. 5 shows a subset of the 188 Haar filters used by an embodiment of the method described herein to form features in 16-by-16 image patches. The largest filters are 16-by-16 pixels.

For each patch, a number of image features were defined. The features were based on a bank of 188 Haar filters—a subset of these is illustrated in FIG. 5. The filter size varies from 1 by 2 pixel to 16 by 16 pixels. Each filter consists of a white and a black region, and a feature is formed by placing the filter inside the patch at a certain displacement from the upper left corner of the patch. For instance, a 2-by-4 filter can be placed in 14 times 12 different locations. The feature value was computed as the average grey level of the patch in the white region minus the corresponding average in the black region. The resulting total number of features for a patch is F=17806.

There were thus P training examples for the regression problem with the feature values of the F features as input, and the known displacement vector as the output. The latter was expressed in a coordinate system where y is the displacement along the mark normal and x perpendicular to that. The mark direction is in general only approximately correct for the actual examples, because the bones vary in shape, and because a perturbation in angle was applied, but it was usually correct to within 0.12 radians. The displacements in the y-direction were expected to be determined with better accuracy than in the x-direction, and the y deviation is most relevant for segmentation of the bone in the framework of ASM: it reflects whether a position is inside or outside the bone. Therefore, the performance of the HF and HT methods were benchmarked in terms of errors in y, and this was expressed as the mean absolute deviations (MAD), rather than root mean square (RMS) error, because when used in the context of ASM, larger errors will be "regularised away" by the shape constraint, so they should be penalised more gently than with a RMS.

A 3-fold cross validation on the subject level was applied.

As a comparative baseline example, a HF model was also trained. The HF model included 10 trees using the following standard randomisation scheme: The first randomisation step was the bagging of X-ray images (i.e. the subjects): There were on average N=51 X-ray images in the ⅔ partition used for training. N subjects from this set were selected randomly by replacement. This means that there was on average 35 subjects represented, some with more than one image. From these selected images the P patches were formed. Each tree was trained using the conventional recursive procedure where the training examples are propagated onto the leaf nodes: The training cases arriving at a node are used to design this node. Firstly, a random selection of f features were chosen among the set of F features; this operation is referred to as feature selection. Secondly, a subset of p patches were chosen (unless there are already no more than p available). Applying a feature and a threshold to the patch subset divides the patches into two branches, and the sum of the standard deviations of x and y in the two branches was defined as the cost of this splitting. The node was designed using the feature and the threshold which yielded the minimum cost. There had to be at least five cases in a branch, and if a branch had less than 20 patches, it was defined as a leaf node.

The HT, on the other hand, was trained using a single, non-random decision tree instead of the RF, so the training of a single tree used all patches (i.e. no bagging), and each node was split using f=F (i.e. with no feature selection) and p=P. Apart from this, the same training method for the tree of the HT model was used as for each of the trees of the RF. The size of the tree was on average the same as each tree in the RF.

Figure 7:
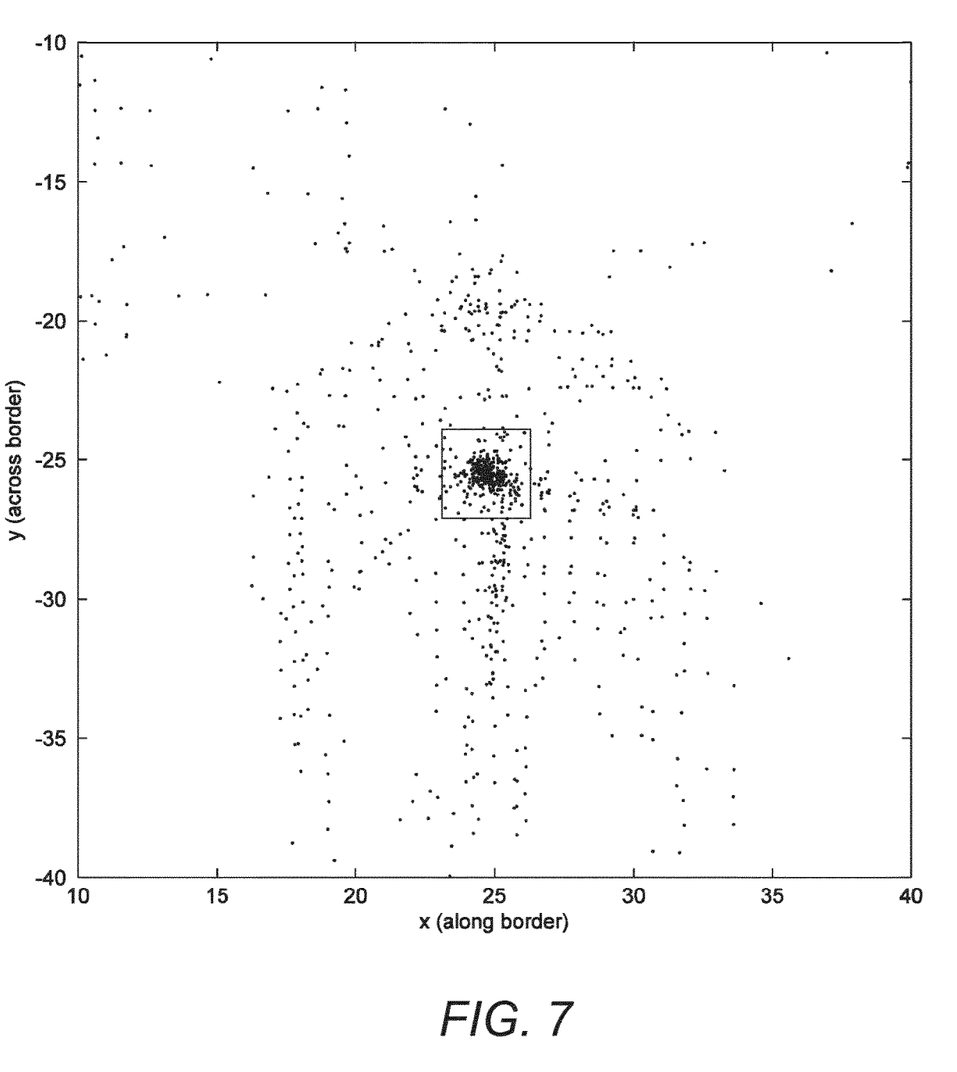
FIG. 7 shows an example of a distribution of votes for locating the tip of the third distal phalanx. 900 of the 1024 votes fell within the plot, and 365 votes lie in the rectangle of size 3.6-by-3.6—these are the votes that influence the quadratic fit to the distribution in a neighbourhood around the maximum.

The HF and HT models were then validated using three-fold cross-validation on all images. When testing the HF and HT models, each validation image was scanned by extracting a patch in 32 times 32 different locations placed densely around the true landmark position, which resulted in casting 1024 votes for the HT tree. For the HF model with 10 trees there were ten times more votes. Each vote was placed in a vote image with resolution 38 dpi: The vote "mass" is distributed over the four nearest neighbour cells, so that the centre of mass of these for sub-vote is equal to vote-vector. FIG. 7 shows an example of the distribution of votes from a HT prior to the 38 dpi discretisation. A slight smearing was performed and the location of the maximum was determined from the votes in 9 pixels centred at the local maximum by fitting a quadratic function. This yielded the predicted landmark location as real values.

The prediction error of the predicted locations compared to the known locations was computed in the x and y directions, and the MAD error was formed. This was done for all patches in the test set, and the MAD error across all examples was formed using three-fold cross validation. Finally, the median of the MAD errors for the 156 marks was computed as a basis for the benchmarking. The mean of the MAD errors was also computed which does not alter the conclusions drawn. The fiducial interval for the mean was derived, and expressed as +−SD. This fiducial estimate was also used when quoting the median MAD errors, as an approximation.

The performance loss when using sparse sampling was also investigated for the two methods, because it had been proposed as a means to economise processing at run time (see Cootes T F et al., "Robust and Accurate Shape Model Fitting Using Random Forest Regression Voting", ibid.).

Figure 6:
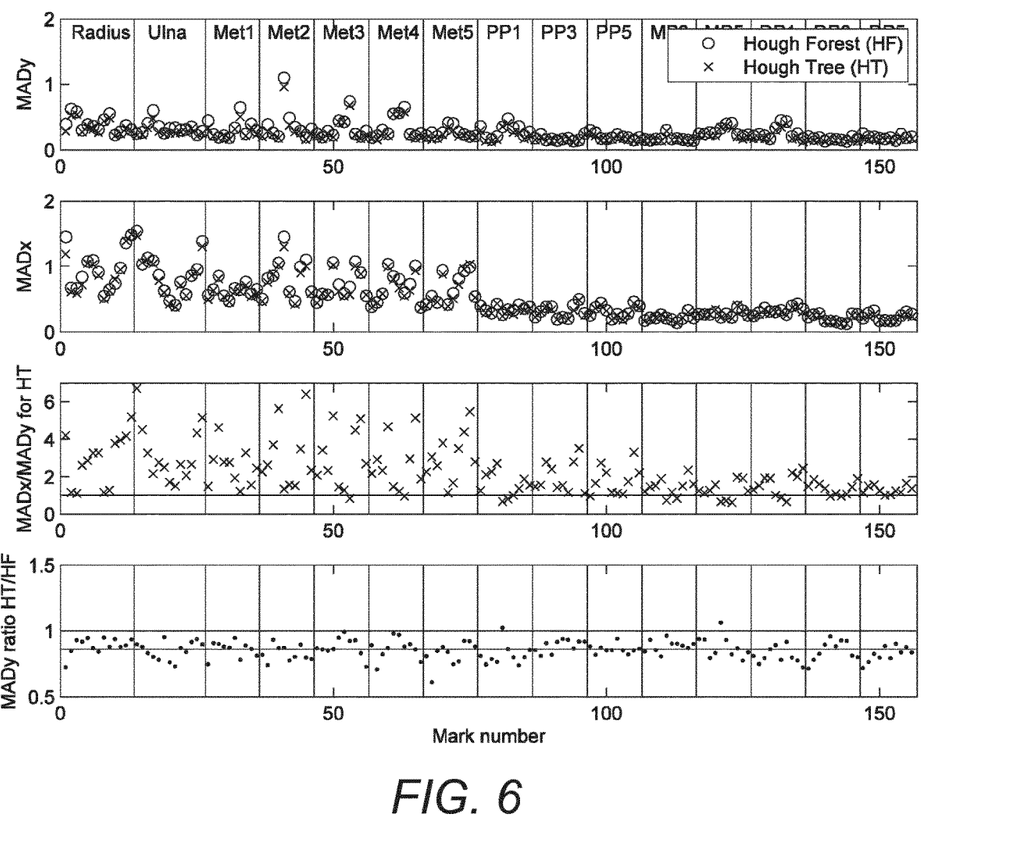
FIG. 6 shows cross-validated mean absolute deviations (MAD) of the localisation of 156 marks. The uppermost plot is for the deviation perpendicular to the bone contour (MADy), while the second plot is for the deviation along the contour (MADx). The third plot shows the ratio of MADx and MADy. The largest MADy errors in Met2-4 are in the proximal ends, while the largest MADx errors in radius and ulna occur at the most proximal marks. The bottom plot shows the ratio of MADy for HF and HT. It is seen for the broad variety of marks, some in clutter and some not, that the improvement with HT is approximately the same. The line at 0.861 represents the median ratio.

The main result is illustrated in FIG. 6 showing the MAD errors of the HF and HT methods, respectively, for the 156 marks. The average MADy was 0.24 pixels, corresponding to 0.16 mm, for the HT method.

The HT gave 13.9±0.7% smaller errors (using the mean one gets 14.5%). This difference can be broken down as follows:

When the number of trees in a random forest is reduced from 10 to 1, the error increases by 2.5±0.2%. Reducing to 2 trees gives an increase of 1.0±0.2%.

A single random tree is receiving its randomness from three sources: bagging, feature selection (limited f) and limited p. Our analysis shows that Removing bagging decreases the error by 2.8%±1.3%
Increasing f from 400 to 1600, decreases the error by 6.2±1.1% (and quadruples the training time)
Increasing p from 400 to P, reduces the error by a further 0.8±0.9% (and approximately doubles the training time). So effect is not statistically significant.
Increasing from f=1600 to f=F, reduces the error by 6.6±0.5% (with a ten-fold increase in training time).

Hence, the elimination of feature selection is the dominant reason for the improvement of the HT method compared to the HF method, and this is also the reason for the increase in training time: the HT takes 8 times longer to train than a HF with ten trees.

The test of sparse sampling of the voting map shows that, with a factor 2, 4 or 9 times fewer samplings, corresponding increases in MADy of
0.6±0.2%, 0.5±0.2% and 2.1±0.3% in HF and
1.6±0.2%, 3.1±0.3% and 8.3±0.6% in HT,
are observed, i.e. a four times stronger effect in HT.

Thus the inventor has realised that use of a single decision tree that does not employ the randomness (as introduced in a random forest of trees) is particularly advantageous when used in the Hough context, i.e. when combined with the use of multiple patches.

It has been a general belief that a RF is typically more powerful than a single decision tree (DT). But this belief is based on situations when it comes to analysing a single pattern. However, in the Hough context a large number of image patches is analysed, i.e. the pattern analyser is invoked multiple times. FIG. 7 shows the votes cast through the scanning of patches near a specific landmark, in this example the tip of the third distal phalanx. The most likely position of the landmark is computed from a discretised version of this distribution by fitting a quadratic function in a 3-by-3 pixel sub-region centred on the pixel with most votes. Thus the result of localisation is governed roughly by the 360 "central" votes inside the indicated square.

The strength of a RF is believed to come from the ensemble effect: The averaging of many, nearly unbiased predictions with large variance produces a low-variance, low-bias result. Hence, in the RF method, randomness is an important aspect as a technique to make the trees as uncorrelated as possible. However, randomness also makes each tree less accurate.

In the HT, the centroid is derived from the central votes, 360 in the example of FIG. 7. While the votes are believed to have small bias, their variance is not necessarily small. But they are uncorrelated to the extent that they originate from different branches of the tree, so the variance of the centroid is reduced by the law of large numbers.

Figure 8:
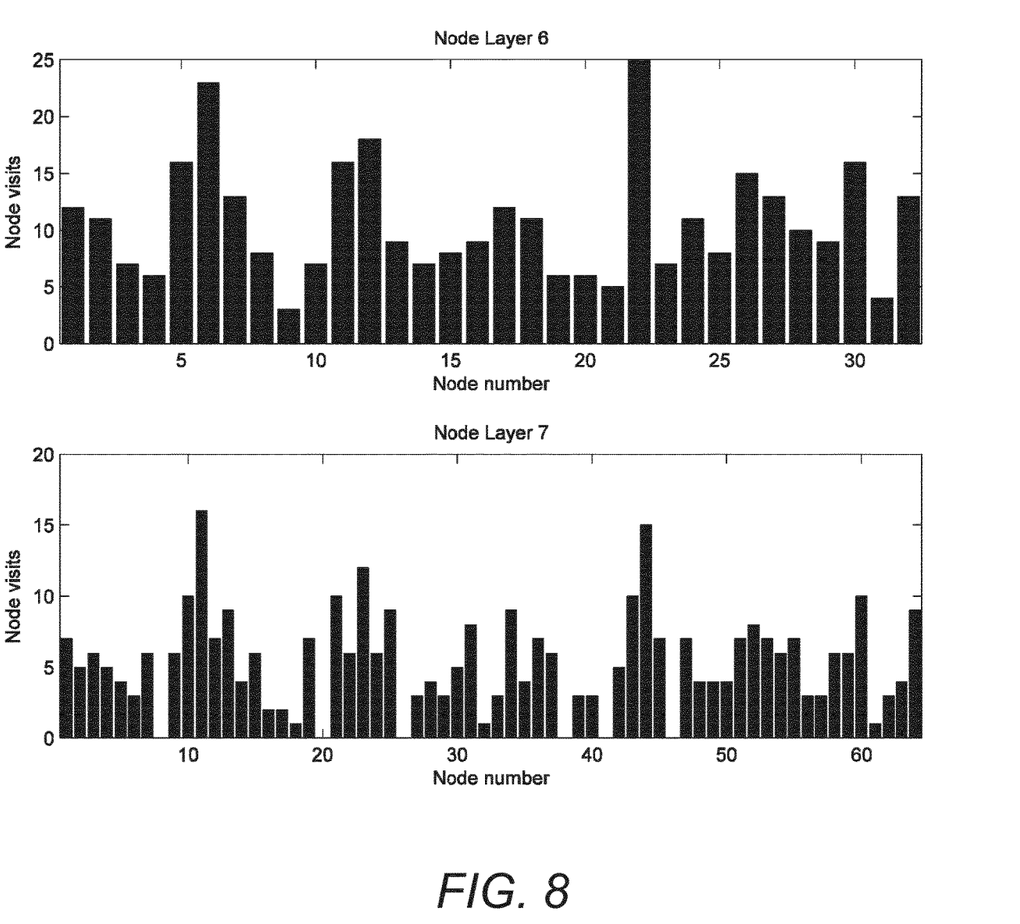
FIG. 8 shows, for the 365 votes falling into the region near the maximum of the voting map, the number of visits of the nodes in layer 6 and 7 of an example of a decision tree. All 32 nodes in layer 6 are visited from 3 to 25 times.

To analyse to what degree the votes come from different branches, it is noted that all branches in the DT start at the root node, but they end up in approx. 300 difference leaves for the case analysed in FIG. 7. On average, the branches pass 12 decision nodes before reaching a leaf. Accordingly, in order to get a reasonable estimate of the number of different branches, depths 6 and 7 of the decision tree have been analysed, which are approximately midway in the branches. In the present example, there were 32 and 64 nodes in these layers, respectively, and FIG. 8 shows the number of times each node was visited. As can be seen from FIG. 8, all the nodes in layer 6 were visited, and so were 58 of the 64 nodes in layer 7. Taking into account that the nodes were not visited equally frequently, an effective number of nodes of 26 in layer 6 and of 45 in layer 7 can be determined for this example. Finally, the geometric mean of these two numbers can be taken to be representative of the middle of the branches ("layer 6.5" is midway between layer 1 and 12), thus resulting at 34 as the effective number of independent branches.

A corresponding analysis of all cases for all 156 landmarks yields 24 as the effective number of independent branches, so the example in FIGS. 7-8 uses somewhat more branches than the average case. On average 38% of the about 2000 nodes, and 10% of the leaves were visited at least once for the central votes. In conclusion, the HT does arrive at "asking many questions", namely 760, when locating a landmark. In the present experiment, using sparse sampling, it was found that sampling 9 times fewer patches, i.e. using less questions, gave a significant loss of accuracy of the HT (8% larger MADy).

This analysis shows that, in the Hough context, there is no need to have several trees. A single tree can implement the "uncorrelated ensemble effect" perfectly well due to the lack of "cross-talk" between different branches of a tree during training.

This explains why one random tree performs only 2.8% worse than a 10-tree forest, and why one random tree performs roughly as well as a RF with 9-fold sparse sampling—the number of votes is about the same.

The improvement obtained by removing the various sources of randomness from a single random tree can be broken down to the following contributions: 2.8% from bagging and 13% from feature selection, and less than 1% from limited p. The observed effect of using all features is surprisingly large. Having more questions to select from when training a tree has thus been found to make large difference. This appears to be a much more efficient way to reduce variance than to use many random trees. Avoiding feature selection implies that the training time for the DT is 8 times larger than for a ten-tree RF, but this has negligible practical importance, as computer power is usually ample at training time.

One embodiment of the HT method is to combine it with the Active Shape Model (ASM). Here the object is described by a set of landmarks and the joint positions of the landmarks are modelled by a statistical shape model.

One useful application of the method described herein is in a method and system for bone age assessment, e.g. as described in: Thodberg H H, Kreiborg S, Juul A, Pedersen K D (2009) The BoneXpert method for automated determination of skeletal maturity; IEEE TransMedImaging 28:52-66. In one embodiment of such a system one needs to locate 18 bones and make models for four different stages of maturity. Each bone requires 50-75 marks for the two levels of ASM, so in total 4500 marks need be located. A HT with 2000 nodes takes up 44 kbytes, which implies that the 4500 HTs take up 200 Mbytes. With the HF model, the memory usage would be 2000 Mbytes, which would make the software more difficult to install and to use in the hospitals, so the smaller size of the HT is another important advantage.

Embodiments of the method described herein may be implemented using one or more computer programs comprising instructions for execution by one or more computer systems. In particular, the program instructions may be run on one or more processors of such computer systems to implement the described processing. Furthermore, such computer program implementations are not limited to conventional computers, but may be supported in a wide range of electronic devices that perform some form of image processing, such as gaming machines, medical scanners and analysis machines (X-ray, MRI, etc), facial recognition system (e.g. for passport control and other biometric applications), portable devices such as smartphones, cameras, etc. In addition, the program instructions may be run on general purpose hardware, or alternatively some or all of the program instructions may be run on special purpose hardware, such as a graphical processing unit (GPU), one or more digital signal processors (DSPs), and so on. The program instructions may also be run in parallel as appropriate—e.g. two target points might be processed in parallel, using multiple cores on a single processor, and/or multiple processors in one or more machines, where multiple machines may be tightly linked in one distributed system, or may be more loosely linked, such as a confederation of clients connected via the Internet. Furthermore, some or all of the processing may be implemented in hardware logic, for example using an application specific integrated circuit (ASIC). The decision tree for use in the processing may be available, from any suitable storage, local or remote, such as a hard disk drive etc., and copied into a memory or directly utilized from the storage at the time of the processing.

The image processing described herein can be utilized in a wide range of applications, for which the following are illustrative examples (but without limitation):

Controlling an avatar in a computer game or animation (e.g. movie)—in other words, facial expressions and movements, mouthed speech, etc. from a user or actor are detected by imaging the face of the person, determining the positions of the target points, and then transferring the same positions (and hence expression) to the avatar. The processing described herein is quick enough to be performed for each successive image frame of a video, which is important for real-time environments such as gaming.

Using the image of the face of a person to control or assist with man-machine interactions, helping the machine to determine, inter alia, the type of face (e.g. age and sex), the expression of the user, and for security applications. A related application would be to monitor and model how a user interacts with machine controls, such as a driver in a car or a pilot in an aeroplane, by tracking where the person is looking to perform various operations and as various events occur.

Pattern recognition tasks as part of medical or other image processing applications: Embodiments of the method disclosed herein may be used as an element in a complete pattern recognition system that may implement several additional processing steps in addition to the method steps described herein, e.g. in the context of the Active Shape Model (ASM).

Although various implementations and embodiments have been described herein, the skilled person will recognize that these implementations and embodiments may be modified or adapted as appropriate according to the various circumstances. The scope of the present invention is defined by the appended claims as well as their equivalents.

For example, a person skilled in the art will be able to set up a number of variations and alternative embodiments. Some examples of alternative embodiments and variations to the embodiments described in detail above include the following:

1. Embodiments have been described where the HT method is used in the context of predicting the coordinates in 2D or 3D of a landmark. In many practical cases, the landmark is a point on the border of the object and it is the location along a direction across the border rather than along the border which is important to predict accurately, because the position along the border is constrained by a statistical shape model (e.g. ASM). The method described herein can easily be adapted to determine landmarks of this kind, by means of a reference direction of that landmark. This direction can be predetermined as the average normal direction of the border in a training set. The output of the HT method can then be designed to be the following 2 numbers: (1) the distance along said direction to the border, and (2) the angle of the border relative to said direction. Incidentally this is reminiscent of the idea in the original conception of the Hough transform, (P. V. C Hough, "Method and means for recognizing complex patterns", U.S. Pat. No. 3,069,654, Dec. 18, 1962)

2. Different embodiments of the method described herein may store different types of information in the leaves. One embodiment stores only the mean displacement in the x and y directions and the standard deviations of x and y, respectively, computed during training from the cases that ended up in the leaf. Optionally the covariance of x and y can be included. Moreover, optionally, the list of all training cases that ended up in the leaf.
3. The voting array may be structured as a pixel array of the same size as the acquired image, but in some embodiments, it can be made with finer pixel size, e.g. with twice as many pixels in each direction.
4. The placement of the votes can be done by placing the vote in the bin that is the nearest neighbour. In another embodiment, votes are placed in four adjacent pixels by distributing the vote mass by linear weighting.
5. The votes can be one per patch, but it can also use a weight which decreases with standard deviations SDx and SDy in the x and y directions, respectively, e.g. weight=1/sqrt(SDx*SDy)
6. The voting array can be smeared slightly before reading off the local maxima. This can merge two very close local maxima into one.
7. When reading off the voting array after all votes have been placed, the process may, for each local maximum, pick the centre of the pixel with most votes. Alternatively, a Gaussian distribution may be fit to the number of vote mass in this maximum pixel and a number of surrounding pixels, e.g. the 8 surrounding pixels.
8. Embodiments of the method described herein may be adapted to applications where data represents 3D (or 4D, or even 1D) data (e.g. depth images). For example, in 3D there are three coordinates of the votes.
9. There are other variations of the scheme not mentioned here, which will be apparent for the person skilled in the art.

In addition, the skilled person will be aware that there are many potential variations that can be made to make different embodiments, including: variations in the details of constructing the decision tree from the training data; in the details of generating a positional estimate or estimates from a decision tree; in the details of applying the decision tree to the reference image (via the patch image); in the details of accumulating positional estimates from the tree in a response image, and in the nature of the response image itself, and so on.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

REFERENCES

1. Gall J, Lempitsky V (2009) Class-specific Hough forests for object detection. 2009 IEEE Conf. Comput. Vis. Pattern Recognit. IEEE, pp 1022-1029
2. Cootes T F, Ionita M C, Lindner C, Sauer P (2012) Robust and Accurate Shape Model Fitting Using Random Forest Regression Voting. Comput. Vision—ECCV 2012. pp 278-291
3. Thodberg H H, Olafsdottir H (2003) Adding curvature to minimum description length shape models. Proc Br Mach Vis Conf 2:251-260
4. Amit Y, Geman D (1997) Shape Quantization and Recognition with Randomized Trees. Neural Comput 9:1545-1588
5. Criminisi A, Shotton J (2013) Decision forests for computer vision and medical image analysis. Springer
6. Breiman L (2001) Random Forests. Mach Learn 45:5-32
7. Shotton J, Fitzgibbon A, Cook M, Sharp T, Finocchio M, Moore R, Kipman A, Blake A (2011) Real-time human pose recognition in parts from single depth images. CVPR 2011. IEEE, pp 1297-1304
8. Cootes T F, Taylor C J, Cooper D H, Graham J (1995) Active Shape Models—Their Training and Application. Comput Vis Image Underst 61:38-59
9. Thodberg H H, Kreiborg S, Juul A, Pedersen K D (2009) The BoneXpert method for automated determination of skeletal maturity. IEEE TransMedImaging 28:52-66
10. Criminisi A, Robertson D, Konukoglu E, Shotton J, Pathak S, White S, Siddiqui K (2013) Regression forests for efficient anatomy detection and localization in computed tomography scans. Med Image Anal 17:1293-303

The invention claimed is:
1. An image processing method for locating a target within an input image, said method comprising:
   a) providing a non-random regression decision tree defined by a plurality of nodes, the plurality of nodes including decision nodes and leaf nodes, the leaf nodes being indicative of respective predicted locations of the target, each decision node having associated with it a decision rule wherein each associated decision rule has associated with it a selected image feature selected from a set of predetermined image features; wherein each selected image feature is chosen from said predetermined set of image features, without random selection of subsets of image features, such that an associated decision rule results in an optimal performance measure compared to all other image features of said predetermined set of image features;
   b) selecting multiple sampling areas within the input image;
   c) for each sampling area of the selected multiple sampling areas:
      computing respective detection scores for one or more of the set of predetermined image features;
      using said non-random regression decision tree and said computed detection scores to compute one or more regression votes, each regression vote being indicative of a predicted location of the target within the input image;
   d) generating a response data structure by accumulating the regression votes determined by said non-random regression decision tree for respective predicted locations; and
   e) determining a location of the target from said response data structure.

2. The method according to claim 1; wherein providing the non-random regression decision tree includes:
   providing a set of training images each having a known location of the target;
   providing a set of training sampling areas within each of the training images;
   providing said predetermined set of image features; and
   performing an optimisation procedure for determining a decision rule for each decision node of the non-random regression decision tree.

3. The method according to claim 2; wherein the optimisation procedure includes processing the decision nodes starting from a root node of the non-random regression decision tree; wherein processing a current decision node includes:

determining a subset of the sets of training sampling areas wherein each training sampling area of the subset is propagated from the root node and through one or more previously processed decision nodes, if any, to said current decision node when the training sampling area is fed into the non-random regression decision tree and subjected to at least one decision rule of the root node and at least one previously processed decision rule; and associating a selected image feature from said predetermined set of image features to the decision rule of the current decision node such that an associated decision rule results in an optimal performance measure compared to all other image features of said predetermined set of image features when the associated decision rule is applied to said determined subset of training sampling areas.

4. The method according to claim 1, wherein computing the regression vote for a sampling location includes determining a single vote indicative of a displacement of the predicted location relative to a reference point associated with the sampling location.

5. The method according to claim 1, wherein the response data structure includes a grid of cells, each cell being indicative of a location within the input image, and accumulating the regression votes includes, for each cell, counting the number of regression votes that fall into said cell.

6. The method according to claim 1, further comprising an initial step of receiving a captured image and converting the captured image to obtain said input image.

7. The method according to claim 1; wherein the target is indicative of a line segment and, optionally, the votes are placed in a 2D parameter space defining all lines.

8. The method according to claim 1; further comprising:
performing steps a)-e) multiple times so as to determine locations of respective targets, said targets being indicative of an extended object within said input image; and
using a statistical shape model to determine a shape property of the extended object.

9. A data processing system having stored thereon program code configured to cause, when executed by the data processing system, to cause the data processing system to perform the steps of the method according to claim 1.

10. A processor-readable tangible non-transient medium storing a computer program for operating a data processing system, the computer program comprising instructions to cause, when executed by said data processing system, to cause the data processing system to perform the steps of the method according to claim 1.

11. An image processing system comprising:
a data processing system having stored thereon program code configured to cause, when executed by the data processing system, to cause the data processing system to perform the steps of the method according to claim 1 and;
an image capture device operationally connected to the data processing system wherein the data processing system is configured to receive image signals from the image capture device indicative of one or more captured images and wherein the data processing device is configured to process the captured image where processing the captured image includes performing the steps of the method according to claim 1.

12. An image processing method for locating a target within an input image, said method comprising:
a) providing a non-random regression decision tree defined by a plurality of nodes, the plurality of nodes including decision nodes and leaf nodes, the leaf nodes being indicative of respective predicted locations of the target, each decision node having associated with it a decision rule wherein each associated decision rule has associated with it a selected image feature selected from a set of predetermined image features; wherein each selected image feature is chosen from said predetermined set of image features, without random selection of subsets of image features, such that an associated decision rule results in an optimal performance measure compared to all other image features of said predetermined set of image features;
b) selecting multiple sampling areas within the input image;
c) for each sampling area of the selected multiple sampling areas:
computing respective detection scores for one or more of the set of predetermined image features;
using said non-random regression decision tree and said computed detection scores to compute one or more regression votes, each regression vote being indicative of a predicted location of the target within the input image;
d) generating a response data structure by accumulating the regression votes determined by said non-random regression decision tree for respective predicted locations; and
e) determining a location of the target from said response data structure.

13. A data processing system having stored thereon program code configured to cause, when executed by the data processing system, to cause the data processing system to perform the steps of the method according to claim 12.

14. A processor-readable tangible non-transient medium storing a computer program for operating a data processing system, the computer program comprising instructions to cause, when executed by said data processing system, to cause the data processing system to perform the steps of the method according to claim 12.

15. An image processing system comprising:
a data processing system having stored thereon program code configured to cause, when executed by the data processing system, to cause the data processing system to perform the steps of the method according to claim 12 and;
an image capture device operationally connected to the data processing system wherein the data processing system is configured to receive image signals from the image capture device indicative of one or more captured images and wherein the data processing device is configured to process the captured image where processing the captured image includes performing the steps of the method according to claim 12.

* * * * *